(12) United States Patent
Jiao et al.

(10) Patent No.: US 12,169,457 B2
(45) Date of Patent: Dec. 17, 2024

(54) ELECTRONIC DEVICE AND METHOD FOR CO-OPERATING SOFTWARE AND HARDWARE

(71) Applicant: Shanghai Zhaoxin Semiconductor Co., Ltd., Shanghai (CN)

(72) Inventors: Yang Jiao, Beijing (CN); Qunyi Yang, Beijing (CN); Jin Xiang, Xi'an (CN); Xinglin Gui, Xi'an (CN); Tingli Cui, Xi'an (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 65 days.

(21) Appl. No.: 18/047,803

(22) Filed: Oct. 19, 2022

(65) Prior Publication Data

US 2023/0169012 A1 Jun. 1, 2023

(30) Foreign Application Priority Data

Oct. 22, 2021 (CN) .......................... 202111231412.2

(51) Int. Cl.
*G06F 12/10* (2016.01)
(52) U.S. Cl.
CPC .................................. *G06F 12/10* (2013.01)
(58) Field of Classification Search
CPC .. G06F 12/10; G06F 12/1027; G06F 12/1081; G06F 13/28; G06F 13/404; G06F 2212/1008; G06F 2212/1032; G06F 2212/303; G06F 2212/683

USPC .......................................................... 711/202
See application file for complete search history.

(56) References Cited

U.S. PATENT DOCUMENTS

| 2008/0276067 | A1* | 11/2008 | Chen .................... | G06F 12/1027 |
| | | | | 711/206 |
| 2015/0106587 | A1* | 4/2015 | Che ...................... | G06F 12/0207 |
| | | | | 711/209 |
| 2015/0248357 | A1* | 9/2015 | Kaplan ................ | G06F 12/1036 |
| | | | | 713/193 |
| 2019/0146936 | A1 | 5/2019 | Williams | |

\* cited by examiner

*Primary Examiner* — Hashem Farrokh
(74) *Attorney, Agent, or Firm* — McClure, Qualey & Rodack, LLP

(57) ABSTRACT

An electronic device includes remapping hardware, a processor, and a Northbridge IC. The remapping hardware converts a virtual address included in an unconverted DMA request into a physical address. The processor executes software to configure the remapping hardware. The Northbridge IC sends the physical address to the processor. When the software changes the configuration of the remapping hardware, the remapping hardware outputs a data draining request to the Northbridge IC. When the Northbridge IC receives the data draining request at a first time, the Northbridge IC suspends unconverted DMA requests after the first time until a second time, and outputs a first data draining response to the remapping hardware at the second time. The remapping hardware receives the first data draining response and notifies the processor that the data draining request has been completed.

12 Claims, 7 Drawing Sheets

US 12,169,457 B2

ELECTRONIC DEVICE AND METHOD FOR CO-OPERATING SOFTWARE AND HARDWARE

CROSS REFERENCE TO RELATED APPLICATIONS

This application claims the benefit of China Application 202111231412.2, filed on Oct. 22, 2021, the entirety of which is incorporated by reference herein.

BACKGROUND

Technical Field

The present application relates to an electronic device, and, in particular, to an electronic device and a method for co-operating software and hardware.

Description of the Related Art

With the rise of artificial intelligence (AI), heterogeneous computing and virtualization technology have become more and more important, and address remapping hardware related to virtualization technology has become indispensable in computer systems. The main function of an address-remapping unit is to handle the conversion of direct memory access (DMA) requests, whose virtual address is converted to a physical address by the address-remapping unit. In order to improve conversion efficiency, the address-remapping unit duplicates the remapping relationship from the memory to its internal cache.

When the software needs to modify the mapping relationship stored in the memory, the DMA requests have been converted (that is, the converted DMA requests) by the remapping unit need to be processed before the modification, and then the remapping relationship stored in the internal cache of the address remapping unit needs to be invalidated. After invalidating the internal cache of the address-remapping unit, the software reports that the cache invalidation is completed. Data draining refers to completing processing of all of the DMA requests converted (that is, the converted DMA requests) by the remapping unit. If data draining is not completed, it may have an irreversible impact on the system.

BRIEF SUMMARY

An embodiment of the present application provides an electronic device that includes remapping hardware, a processor, and a Northbridge integrated circuit (IC). The remapping hardware converts a virtual address included in an unconverted DMA request into a physical address. The processor executes software to configure the remapping hardware. The Northbridge IC sends the physical address to the processor. When the software changes the configuration of the remapping hardware, the remapping hardware outputs a data draining request to the Northbridge IC. When the Northbridge IC receives the data draining request at a first time, the Northbridge IC suspends unconverted DMA requests received after the first time until a second time, and outputs a first data draining response to the remapping hardware at the second time. The second time is later than the first time. The remapping hardware receives the first data draining response and notifies the processor that the data draining request has been completed.

An embodiment of the present application provides a method for co-operating software and hardware. The method is suitable for an electronic device having remapping hardware, a processor, and a Northbridge integrated circuit (IC). The processor executes software to configure the remapping hardware. The method includes as follows. The software changes the configuration of the remapping hardware. The remapping hardware determines that there is no previous data draining request that has not completed yet. The remapping hardware outputs a data draining request to the Northbridge IC. The Northbridge IC receives the data draining request at a first time. The Northbridge IC suspends unconverted DMA request received after the first time until a second time. The Northbridge IC outputs a first data draining response to the remapping hardware at the second time. The second time is later than the first time. The remapping hardware receives the first data draining response and notifies the processor that the data draining request has been completed.

BRIEF DESCRIPTION OF THE DRAWINGS

The present application may be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the present application.

DETAILED DESCRIPTION

Certain words are used to refer to specific elements in the specification and the claims. Those with ordinary knowledge in the technical field should understand that hardware manufacturers may use different terms to refer to the same component. The specification and the claims of the present application do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field may solve the technical problem within a certain error range, and basically achieve the technical effect. In addition, the term "coupled" herein includes any direct and indirect electrical connection means. Therefore, if it is described in the text that a first device is coupled to a second device, it means that the first device may be directly electrically connected to the second device, or indirectly electrically connected to the second device through other devices or connecting means. The following descriptions are preferred ways to implement the present application. The purpose is to illustrate the spirit of the present application and not to limit the scope of protection of the present application.

The following descriptions are used to illustrate the general principles of the present application and should not be used to limit the present application. The protection scope of the present application should be determined on the basis of referring to the scope of the claims of the present application.

Figure 1:
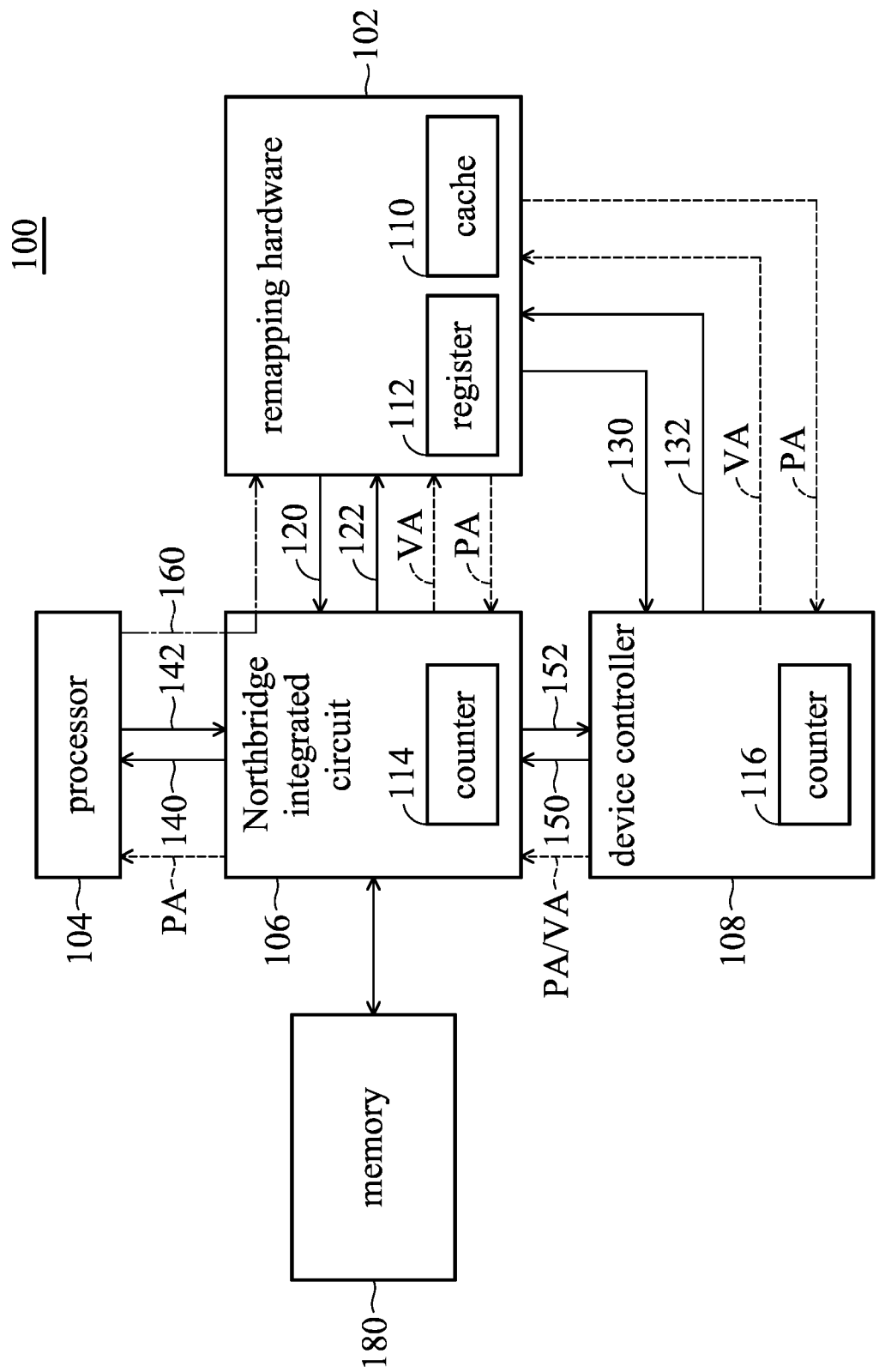
FIG. 1 is a schematic diagram of an electronic device 100 in accordance with some embodiments of the present application.

FIG. 1 is a schematic diagram of an electronic device 100 in accordance with some embodiments of the present application. As shown in FIG. 1, the electronic device 100 includes a remapping hardware 102, a processor 104, a Northbridge integrated circuit (IC) 106, and a device controller 108. In some embodiments, the remapping hardware 102 converts a virtual address included in an unconverted DMA request into a physical address. The remapping hardware 102 includes a cache 110 (e.g., the internal cache, as mentioned). The cache 110 stores a mapping table that records the corresponding remapping relationship between the virtual address and the physical address. In some embodiments, the electronic device 100 may be, for example, a laptop, a desktop, a tablet, a smart mobile device, or a workstation server. The device controller 108 may be, for example, a hard disk controller, a network card controller, or the like.

For example, when the device controller 108 reads data from a memory 180 in the electronic device 100, some steps need to be performed. First, the device controller 108 outputs a virtual address VA included in an unconverted DMA request to the remapping hardware 102. The remapping hardware 102 converts the virtual address VA into a physical address PA according to the mapping table in the cache 110, and sends the physical address PA back to the device controller 108. The device controller 108 generates a converted DMA request according to the unconverted DMA request and the physical address PA. Then, the device controller 108 sends the converted DMA request with the physical address PA to the Northbridge IC 106, and the Northbridge IC 106 forwards the converted DMA request with the physical address PA to the processor 104 and the memory 180 for further processing. Finally, the memory 180 sends the data to the device controller 108 according to the physical address PA.

In some embodiments, the device controller 108 intends to write data into the memory 180 of the electronic device 100, but there is no direct interface between the device controller 108 and the remapping hardware 102. Therefore, the device controller 108 outputs the unconverted DMA request with the virtual address VA to the Northbridge IC 106 first, and the Northbridge IC 106 then sends the virtual address VA to the remapping hardware 102. Similarly, the remapping hardware 102 converts the virtual address VA into the physical address PA according to the mapping table in the cache 110. Then, the remapping hardware 102 sends the physical address PA to the Northbridge IC 106. The Northbridge IC 106 generates a converted DMA request according to the unconverted DMA request and the physical address PA. The Northbridge IC 106 then sends the converted DMA request with the physical address PA to the processor 104 and the memory 180 for further processing. Finally, the device controller 108 writes the data to the memory 180 according to the physical address PA.

In some embodiments, the configuration of the remapping hardware 102 may be changed by the software (e.g., the driver of the Northbridge IC 106) running on the processor 104. When changing the configuration of the remapping hardware 102, the processor 104 outputs a configuration request 160 to the remapping hardware 102. After receiving the configuration request 160, the remapping hardware 102 outputs a data draining request (e.g., the data draining requests 120 and 130) correspondingly to the components (such as the Northbridge IC 106 and the device controller 108) connected to itself.

As aforementioned, there are two kinds of DMA request in the Northbridge IC 106 or the device controller 108. One is the unconverted DMA request, and the other is the converted DMA request. The unconverted DMA request is the DMA request whose virtual address VA is not converted into the physical address PA yet. The converted DMA request is the DMA request whose virtual address VA has already been converted into the physical address PA.

When the Northbridge IC 106 receives the data draining request 120 from the remapping hardware 102 at a first time, the Northbridge IC 106 suspends the unconverted DMA requests received after the first time until a second time. On the other hand, the converted DMA requests with the physical address PA have to be processed between the first time and the second time, wherein the converted DMA requests with the physical address PA are received from the remapping hardware 102 before or at the first time. The last converted DMA request with the physical address PA is processed at the second time. The second time is later than the first time. After the second time, the Northbridge IC 106 informs the remapping hardware 102 to convert the unconverted DMA requests, which are suspended at the first time. Similarly, when the device controller 108 receives the data draining request 130 from the remapping hardware 102 at the first time, the device controller suspends the unconverted DMA requests received after the first time until a third time. On the other hand, the converted DMA requests with the physical address PA have to be processed between the first time and the third time, wherein the converted DMA requests with the physical address PA are received from the remapping hardware 102 before or at the first time. The last converted DMA request with the physical address PA is processed at the third time. The third time is later than the first time. After the third time, the device controller 108 informs the remapping hardware 102 to convert the unconverted DMA requests, which are suspended at the first time. The second time can be earlier or later than the third time and it depends on the different components, but the present application is not limited thereto.

In some embodiments, when the Northbridge IC 106 completes the processing of the converted DMA requests, the Northbridge IC 106 outputs a data draining response 122 to the remapping hardware 102 at the second time. Similarly, when the device controller 108 completes the processing of the converted DMA requests, the device controller 108 outputs a data draining response 132 to the remapping hardware 102 at the third time.

After the remapping hardware 102 receives the data draining response 122 and the data draining response 132, the remapping hardware 102 then notifies the processor 104 that the data draining has been completed. After that, the remapping hardware 102 updates the corresponding remapping relationship between the virtual address and the physical address recorded in the mapping table in the cache 110, so as to process the DMA requests according to the new remapping relationship. After the mapping table in the cache 110 is updated, the Northbridge IC 106 and the device controller 108 then start to convert the unconverted DMA requests received after the first time.

Briefly, the remapping hardware 102 does not notify the processor 104 that the data draining has been completed until the remapping hardware 102 receives all the data draining responses (e.g., the data draining responses 122 and 132) from all the components connected to itself.

Northbridge IC 106 and the device controller 108 may only process one data draining request received at the same time (such as the first time, as mentioned). After the software changes the configuration of the remapping hardware 102 and before the remapping hardware 102 outputs another new data draining request, the remapping hardware 102 checks whether the present data draining request has not been completed. In detail, in order to confirm the present data draining request has been completed, the remapping hardware 102 checks whether all the data draining responses have been received from all the components. When the remapping hardware 102 has received all the data draining responses from all the components, it indicates the present data draining request has been completed, and the remapping hardware 102 confirms that there is no other data draining request that needs to be processed at this moment. Then, the remapping hardware 102 simultaneously outputs another new data draining to the Northbridge IC 106 and the device controller 108.

In some embodiments, when the Northbridge IC 106 receives the data draining request 120 from the remapping hardware 102 at the first time, the Northbridge IC 106 continues to process the converted DMA requests that were still being processed before the first time. For example, if the Northbridge IC 106 has sent a converted DMA request 140 to the processor 104 for further processing before the first time, the Northbridge IC 106 will wait for the processing result 142 from the processor 104.

Similarly, when the device controller 108 receives the data draining request 130 from the remapping hardware 102 at the first time, the device controller 108 continues to process the converted DMA requests that were still being processed before the first time. For example, if the device controller 108 has sent a converted DMA request 150 (through the Northbridge IC 106) to the processor 104 for further processing before the first time, the device controller 108 will wait for the processing result 152 (through the Northbridge IC 106) from the processor 104. In some embodiments, the converted DMA requests 140 and 150 may be DMA read requests or DMA write requests, but the present application is not limited thereto.

In some embodiments, the Northbridge IC 106 includes a counter 114. When the Northbridge IC 106 receives the data draining request 120 at the first time, the counter 114 counts the amount of converted DMA requests (such as the converted DMA request 140) still being processed before the first time. The counter 114 further counts the amount of processing results (such as the processing result 142) corresponding to the converted DMA requests being processed before the first time.

In detail, it is assumed that there are 10 converted DMA requests still being processed by the Northbridge IC 106 before the first time. Each time the Northbridge IC 106 continues to process one of the 10 converted DMA requests, the count value of the counter 114 is incremented by 1. Each time the Northbridge IC 106 receives a processing result corresponding to one of the 10 converted DMA requests from the processor 104, the count value of the counter 114 is decremented by 1. When the count value of the counter 114 becomes zero, the Northbridge IC 106 outputs the data draining response 122 to the remapping hardware 102.

Similarly, in some embodiments, the device controller 108 includes a counter 116. When the device controller 108 receives the data draining request 130 at the first time, the counter 116 counts the amount of converted DMA requests still being processed before the first time, and counts the amount of processing results corresponding to the converted DMA requests being processed before the first time.

Similarly, it is assumed that there are 5 converted DMA requests still being processed by the device controller 108 before the first time. Each time the device controller 108 continues to process one of the 5 converted DMA requests, the count value of the counter 116 is incremented by 1. Each time the device controller 108 receives a processing result corresponding to one of the 5 converted DMA requests from the processor 104, the count value of the counter 116 is decremented by 1. When the count value of the counter 116 becomes zero, the device controller 108 outputs the data draining response 132 to the remapping hardware 102. In some embodiments, the device controller 108 is a Peripheral Interconnect Interface Express (PCI-e) device, but the present application is not limited thereto.

Figure 2:
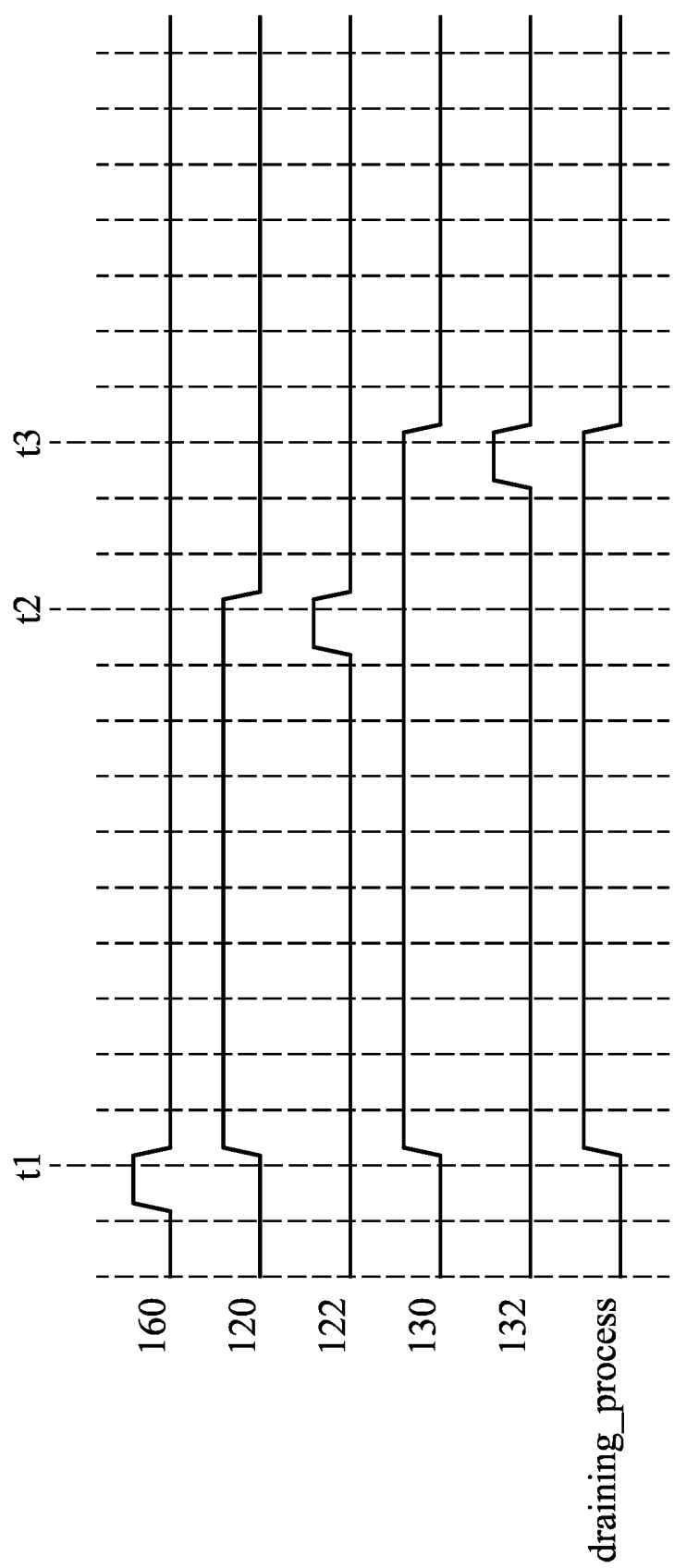
FIG. 2 is a signal-timing diagram of the electronic device 100 in FIG. 1 processing a data draining request in accordance with some embodiments of the present application.

FIG. 2 is a signal timing diagram of the electronic device 100 in FIG. 1 processing a data draining request in accordance with some embodiments of the present application. Please refer to FIG. 1 and FIG. 2 at the same time. When the software changes the configuration of the remapping hardware 102, the processor 104 outputs the configuration request 160 to the remapping hardware 102. The remapping hardware 102 receives the configuration request 160 from the processor 104 at time t1 (such as the first time, as mentioned), so that the remapping hardware 102 simultaneously outputs the data draining request 120 to the Northbridge IC 106, and outputs the data draining request 130 to the device controller 108 correspondingly at the time t1. The remapping hardware 102 receives the data draining response 122 from the Northbridge IC 106 at time t2 (such as the second time, as mentioned), and knows that the Northbridge IC 106 has completed the data draining. Therefore, the remapping hardware changes the data draining request 120 from a high voltage level to a low voltage level, indicating that the data draining has been completed.

Similarly, the remapping hardware 102 receives the data draining response 132 from the device controller 108 at time t3 (such as the third time, as mentioned), and knows that the device controller 108 has completed the data draining. Therefore, the remapping hardware 102 changes the data draining request 130 from the high voltage level to the low voltage level, indicating that the processing of the data draining has been completed. The Northbridge IC 106 executes the data draining between the time t1 and the time t2. The device controller 108 executes the data draining between the time t1 and the time t3. The second time can be earlier than the third time in this example, but the present application is not limited thereto.

The remapping hardware 102 has to wait for the Northbridge IC 106 and the device controller 108 to complete the data draining (that is, after receiving both the data draining responses 122 and 132), and then the remapping hardware 102 notifies the processor 104. Therefore, the period of the data draining process (e.g., the draining_process in FIG. 2) is from the time t1 to the time t3 for the electronic device 100.

In some embodiments, the processor 104 outputs the configuration request 160 to the remapping hardware 102 according to the corresponding reconfiguration of the remapping hardware 102 that was performed by the software. The configuration request 160 may include a DMA remapping function on/off request, a DMA protected memory check function on/off request, an input/output translation lookaside buffer (IOTLB) cache invalidation request, an interrupt remapping function on/off request, or an interrupt remapping entry cache (IREC) invalidation request. As long as the remapping hardware 102 receives the above-mentioned DMA remapping function on/off request, DMA protected memory check function on/off request, IOTLB cache invalidation request, interrupt remapping function on/off request, and IREC invalidation request, the remapping hardware 102 correspondingly sends the data draining requests 120 and 130 to the Northbridge integrated circuit 106 and the device controller 108, respectively.

Figure 3:
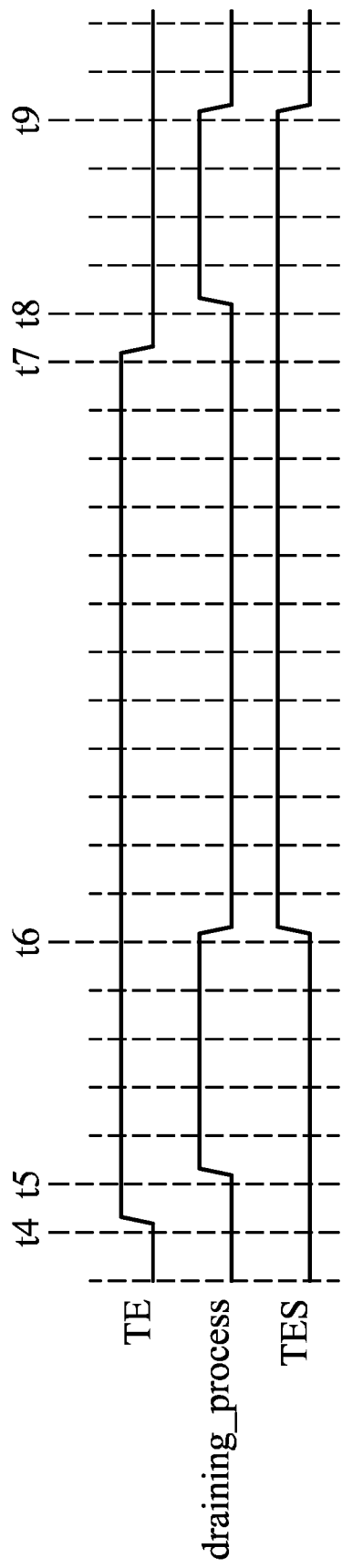
FIG. 3 is a signal-timing diagram of remapping hardware 102 and a processor 104 in FIG. 1 notifying each other through a register in accordance with some embodiments of the present application.

FIG. 3 is a signal timing diagram of remapping hardware 102 and a processor 104 in FIG. 1 notifying each other through a register in accordance with some embodiments of the present application. Please refer to FIG. 1 and FIG. 3 at the same time. The remapping hardware 102 further includes a register 112. In some embodiments, the register 112 includes a sub-register TE and a sub-register TES (not shown). The sub-register TE and the sub-register TES correspond to the DMA remapping function on/off request. The processor 104 notifies the remapping hardware 102 that the DMA remapping function on/off request has been issued by changing the state of the sub-register TE. The remapping hardware 102 notifies the processor 104 that the data draining associated with the DMA remapping function on/off request has been completed by changing the state of the sib-register TES.

For example, as shown in FIG. 3, the processor 104 changes the state of the sub-register TE from the low voltage level to the high voltage level at a time t4. That is, the processor 104 sends the DMA remapping function on request to the remapping hardware 104 at the time t4. The remapping hardware 102 reads the sub-register TE and knows that the state of the sub-register TE has been changed. At a time t5 (similar to the first time, as mentioned), the remapping hardware 102 sends the data draining request (e.g., the data draining requests 120 and 130) to the Northbridge IC 106 and the device controller 108. The Northbridge IC 106 and the device controller 108 perform the data draining between the time t5 and a time t6 (similar to the third time, as mentioned). The remapping hardware 102 receives the data draining responses (e.g. both the data draining responses 122 and 132) from the Northbridge IC 106 and the device controller 108 at the time t6, so the data draining signal draining_process changes from the high voltage level to the low voltage level at the time t6. At the same time, the remapping hardware 102 changes the state of the sub-register TES from the low voltage level to the high voltage level at the time t6. The processor 104 reads the sub-register TES and knows that the state of the sub-register TES has been changed, so that the software knows at the time t6 that the data draining associated with the DMA remapping function on request has been completed.

Similarly, as shown in FIG. 3, the processor 104 changes the state of the sub-register TE from the high voltage level to the low voltage level at a time t7. That is, the processor 104 sends the DMA remapping function off request to the remapping hardware 102 at the time t7. The remapping hardware 102 reads the sub-register TE and knows that the state of the sub-register TE has been changed, so the remapping hardware 102 sends the data draining request to the Northbridge IC 106 and the device controller 108 at a time t8 (similar to the first time, as mentioned). The Northbridge IC 106 and the device controller 108 perform the data draining between the time t8 and a time t9. The remapping hardware 102 receives the data draining response from the Northbridge IC 106 and the device controller 108 at the time t9 (similar to the third time, as mentioned), so the data draining signal draining_process changes from the high voltage level to the low voltage level at the time t9. At the same time, the remapping hardware 102 changes the state of the sub-register TES from the high voltage level to the low voltage level at the time t9. The processor 104 reads the sub-register TES and knows that the state of the sub-register TES has been changed, so that the software knows at the time t9 that the data draining associated with the DMA remapping function off request has been completed.

In some embodiments, the register 112 includes a sub-register EPM and a sub-register PRS (not shown). When the configuration request 160 is the DMA protected memory check function on/off request, the processor 104 notifies the remapping hardware 102 that the DMA protected memory check function on/off request has been issued by changing the state of the sub-register EPM. The remapping hardware 102 notifies the processor 104 that the data draining request associated with the DMA protected memory check function on/off request has been executed by changing the state of the sub-register PRS.

In some embodiments, when the configuration request 160 is the IOTLB cache invalidation request, the processor 104 directly sends an IOTLB invalidation request to the remapping hardware 102, so that the remapping hardware 102 sends the data draining request to the Northbridge IC 106 and the device controller 108 correspondingly. The remapping hardware 102 directly sends an interrupt event to the processor 104 to notify the software that the data draining request associated with the IOTLB cache invalidation request has been completed.

In some embodiments, the register 112 includes a sub-register IRE and a sub-register IRES (not shown). When the configuration request 160 is the interrupt remapping function on/off request, the processor 104 notifies the remapping hardware 102 that the interrupt remapping function on/off request has been issued by changing the state of the sub-register IRE. The remapping hardware 102 notifies the processor 104 that the data draining associated with the interrupt remapping function on/off request has been completed by changing the state of the sub-register IRES.

In some embodiments, when the configuration request 160 is the IREC cache invalidation request, the processor 104 directly sends an IREC invalidation request to the remapping hardware 102, so that the remapping hardware 102 sends the data draining request to the Northbridge IC 106 and the device controller 108 correspondingly. The remapping hardware 102 directly sends an interrupt event to the processor 104 to notify the software that the data draining associated with the IREC invalidation request has been completed.

Figure 4:
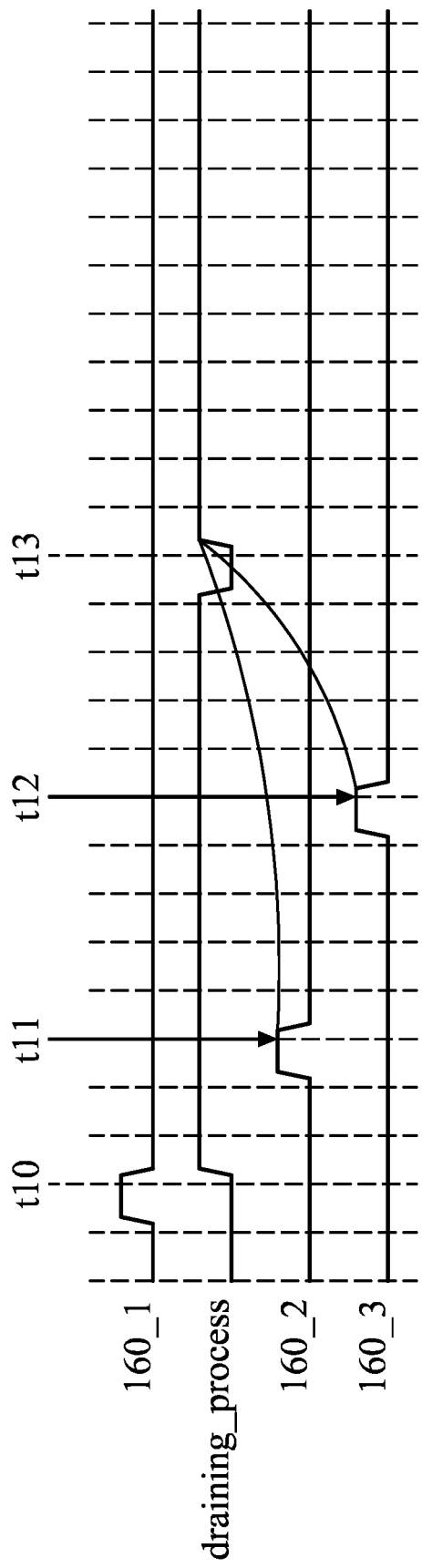
FIG. 4 is a signal-timing diagram of the remapping hardware 102 in FIG. 1 receiving a plurality of configuration requests from a processor 104 in accordance with some embodiments of the present application.

FIG. 4 is a signal timing diagram of the remapping hardware 102 in FIG. 1 receiving a plurality of configuration requests from a processor 104 in accordance with some embodiments of the present application. Please refer to FIG. 1 and FIG. 4 at the same time. The remapping hardware 102 receives a configuration request 106_1 from the processor 104 at a time t10, and simultaneously outputs the data draining request to the Northbridge IC 106 and the device controller 108 correspondingly. The Northbridge IC 106 and the device controller 108 then start to perform the data draining at the time t10 (similar to the first time, as mentioned), the data draining signal draining_process changes from the low voltage level to the high voltage level at the time t10).

Then, the remapping hardware 102 receives configuration requests 160_2 and 160_3 from the processor 104 at a time t11 and t12, respectively. As shown in FIG. 4, at the time t11 and the time t12, the Northbridge IC 106 and the device controller 108 are still executing the data draining corresponding to the configuration request 160_1, so the remapping hardware 102 may only wait for the data draining corresponding to the configuration request 160_1 to complete. After completing the data draining corresponding to the configuration request 160_1, the remapping hardware 102 can send the data draining instruction 160_2 to the Northbridge IC 106 and the device controller 108 at a time t13.

After the data draining corresponding to the configuration request 160_2 is completed, the remapping hardware 102 can send the data draining request corresponding to the configuration request 160_3 to the Northbridge IC 106 and the device controller 108 again (the sending time is not shown in FIG. 4). To put it simply, the Northbridge IC 106 and the device controller 108 may process only one data draining request received at the same time in each period of the draining process.

Figure 5:
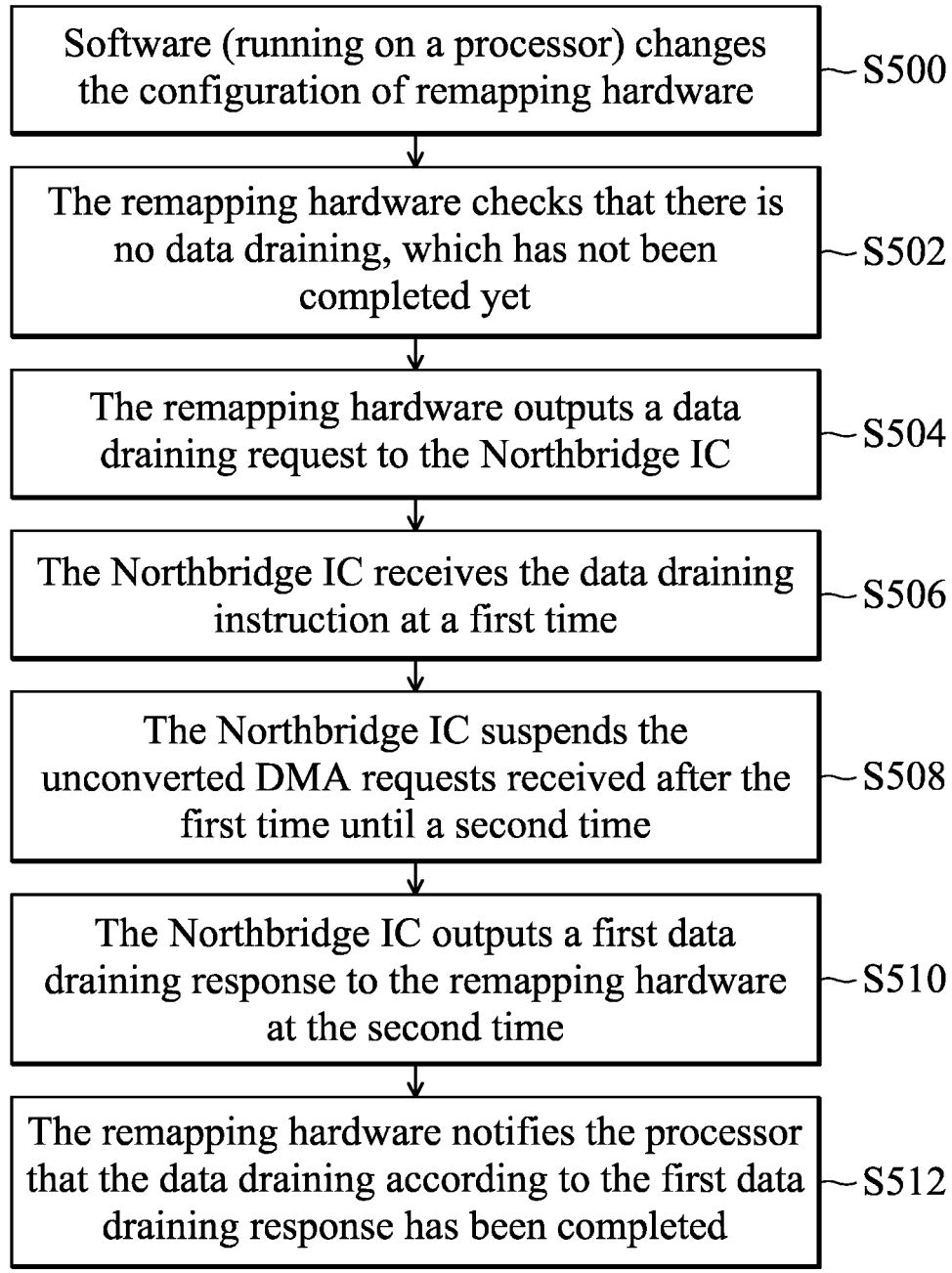
FIG. 5 is a flow chart of a method for co-operating software and hardware applicable to the remapping hardware 102, the processor 104, and the Northbridge IC 106 in FIG. 1 in accordance with some embodiments of the present application.

FIG. 5 is a flow chart of a method for co-operating software and hardware applicable to the remapping hardware 102, the processor 104, and the Northbridge IC 106 in FIG. 1 in accordance with some embodiments of the present application. As shown in FIG. 5, in step S500, the software (running on the processor 104) first changes the configuration of the remapping hardware. In step S502, the remapping hardware 102 checks that there is no data draining, which has not been completed yet. Then, in step S504, the remapping hardware 102 outputs a data draining request (e.g., the data draining request 120) to the Northbridge IC 106. In step S506, the Northbridge IC 106 receives the data draining request at a first time.

Furthermore, in step S508, the Northbridge IC 106 suspends the unconverted DMA requests received after the first time until a second time. In step S510, the Northbridge IC 106 outputs a first data draining response (e.g., the data draining response 122) to the remapping hardware 102 at the second time. The second time is later than the first time. Finally, in step S512, the remapping hardware 102 notifies the processor 104 that the data draining according to the first data draining response has been completed.

Figure 6:
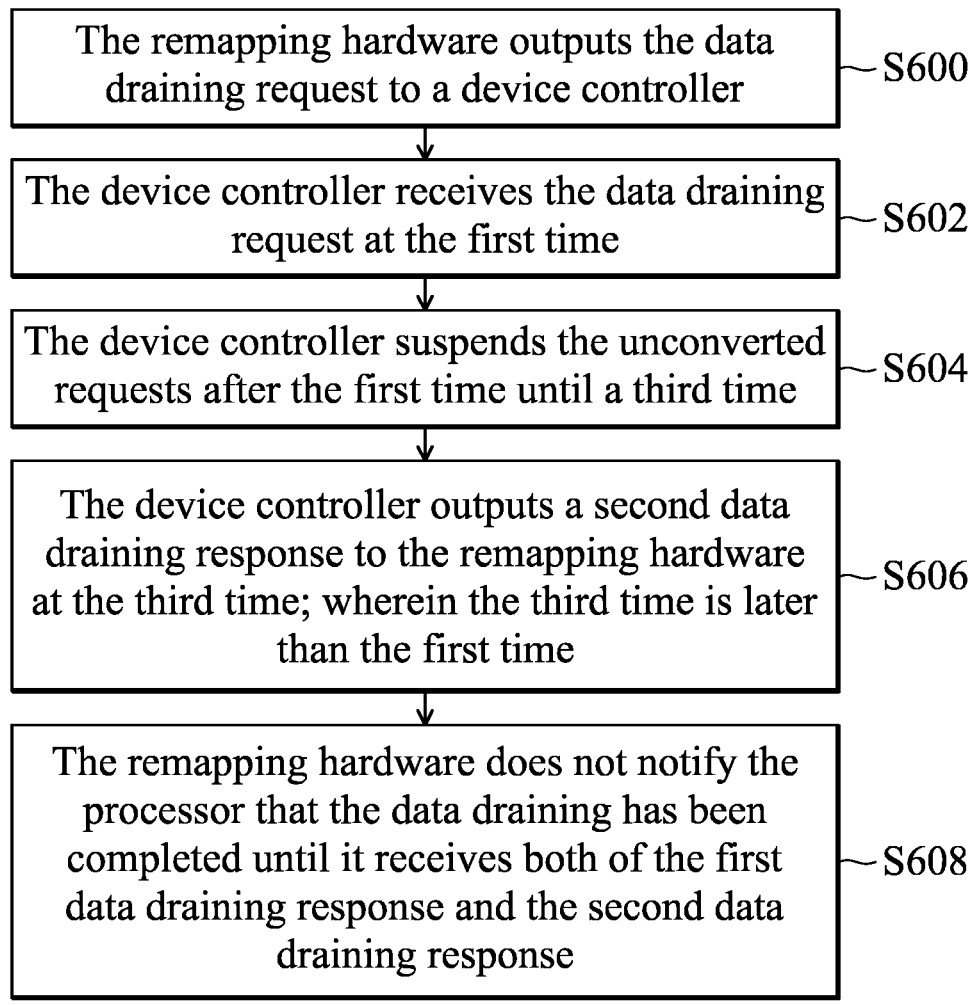
FIG. 6 is a flow chart of a method for co-operating software and hardware based on FIG. 5, applicable to the remapping hardware 102, the processor 104, the Northbridge IC 106, and the device controller 108 in FIG. 1, in accordance with some embodiments of the present application.

FIG. 6 is a flow chart of a method for co-operating software and hardware based on FIG. 5, applicable to the remapping hardware 102, the processor 104, the Northbridge IC 106, and the device controller 108 in FIG. 1, in accordance with some embodiments of the present application. As shown in FIG. 6, in addition to steps S504 to S510 in FIG. 5, the method for co-operating software and hardware of the present application further includes steps S600 to S608, which are executed parallel with the steps S504 to S510 in FIG. 5. In step S600, the remapping hardware 102 outputs the data draining request (e.g., the data draining request 130) to the device controller 108. In step S602, the device controller 108 receives the data draining request at the first time.

In step S604, the device controller 108 suspends the unconverted requests after the first time until a third time. Then, in step S606, at the third time, the device controller 108 outputs a second data draining response (e.g., the data draining response 132) to the remapping hardware 102. The third time is later than the first time. Finally, in step S608, the remapping hardware 102 does not notify the processor 104 that the data draining has been completed until it receives both the first data draining response and the second data draining response.

Figure 7:
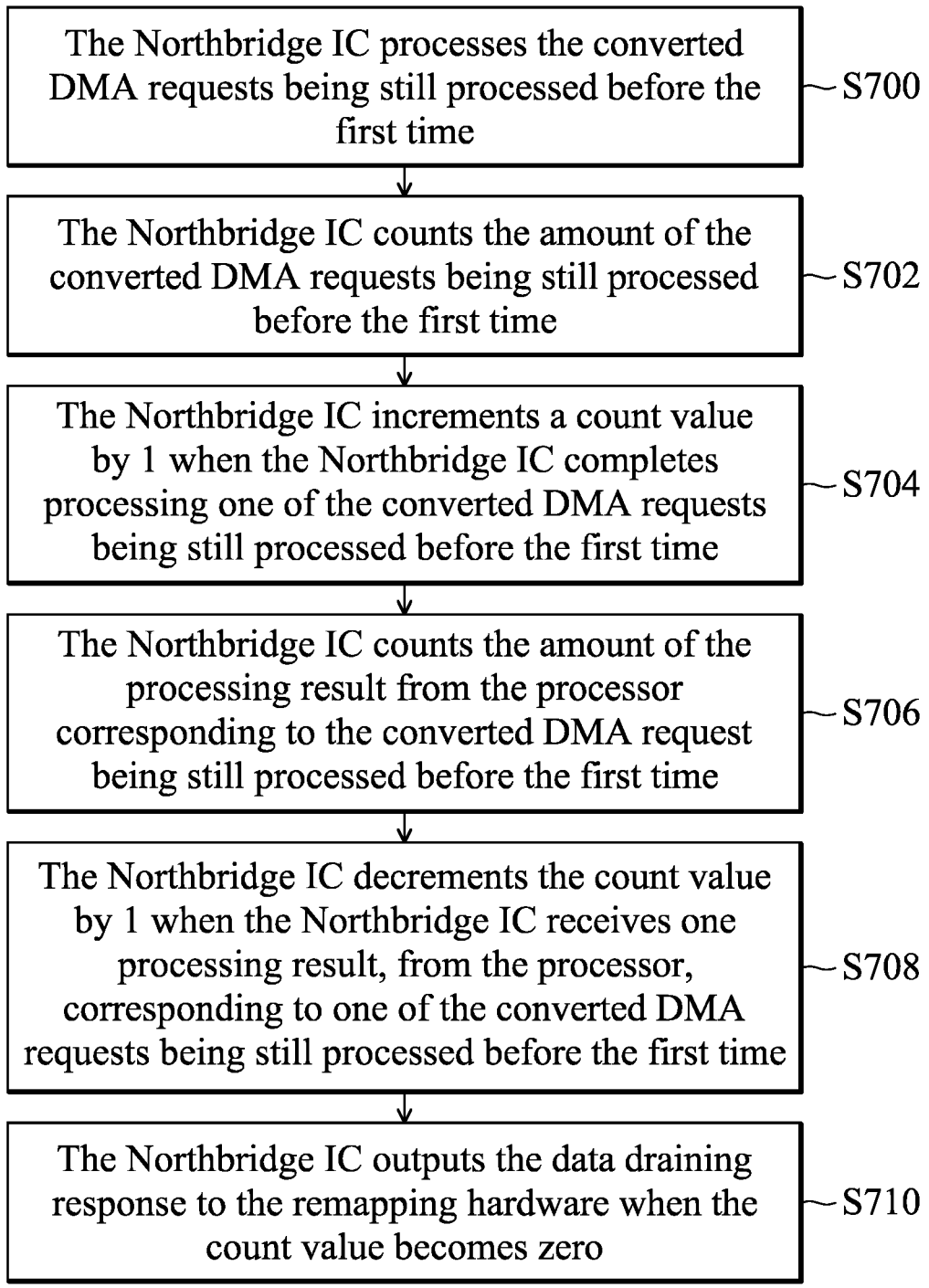
FIG. 7 is a detailed flowchart of step S508 in FIG. 5 in accordance with some embodiments of the present application.

FIG. 7 is a detailed flowchart of step S508 in FIG. 5 in accordance with some embodiments of the present application. As shown in FIG. 7, in step S700, the Northbridge IC 106 processes the converted DMA requests still being processed before the first time. In step S702, the Northbridge IC 106 counts the amount of converted DMA requests still being processed before the first time. In step S704, the count value is incremented by 1 when the Northbridge IC 106 completes processing one of the converted DMA requests still being processed before the first time.

Then, in step S706, the Northbridge IC 106 counts the amount of processing result from the processor 104 corresponding to the converted DMA request still being processed before the first time. In step S708, the count value is decremented by 1 when the Northbridge IC 106 receives one processing result, from the processor 104, corresponding to one of the converted DMA requests still being processed before the first time. Finally, in step S710, the Northbridge IC 106 outputs the data draining response (e.g., the data draining response 122) to the remapping hardware 102 when the count value becomes zero.

The electronic device and method for improving the cooperative work of software and hardware of the present application increase the reliability of the IO virtualization hardware, and may protect the data of the system to a certain extent. When the IO virtualization device faces the virtualization software changing the system state or modifying the memory page content, the hardware is more able to smooth the transition.

The data draining process disclosed by the present application has the following advantages. 1) It does not affect the performance of other normal functions. 2) Completing data draining process without missing any converted DMA request. 3) Processing results (e.g., the processing results 142 and 152) corresponding to the converted DMA requests are used to confirm whether the data draining is completed. The processor in the prior art does not respond to the converted DMA request, but only receives and processes the converted DMA requests. It means no processing result could be received. 4) The data draining process between the remapping hardware and the Northbridge IC (or the device controller) is performed by using handshake signals (for example, the data draining request 120 corresponds to the data draining response 122, and the data draining request 130 corresponds to the data draining response 132). 5) The remapping hardware only issues specific data draining requests at specific time (for example, when the configuration request 160 is the DMA remapping function on/off request, the DMA protected memory check function on/off request, the IOTLB cache invalidation request, the interrupt remapping function on/off request, or the IREC invalidation request).

Although the present application is disclosed above in the preferred embodiment, it is not intended to limit the scope of the present application. Anyone with ordinary knowledge in the relevant technical field may make changes and modifications without departing from the spirit and scope of the present application. Therefore, the protection scope of the present application shall be determined by the scope of the claims.

What is claimed is:

1. An electronic device, comprising:
a remapping hardware, converting a virtual address into a physical address;
a processor, executing software to configure the remapping hardware;
a Northbridge integrated circuit (IC); wherein
when the software changes the configuration of the remapping hardware, the remapping hardware outputs a first data draining request to the Northbridge IC;
when the Northbridge IC receives the first data draining request at a first time, the Northbridge IC suspends unconverted DMA requests received after the first time until a second time, and outputs a first data draining response to the remapping hardware at the second time; wherein the second time is later than the first time;
the remapping hardware receives the first data draining response and notifies the processor that the processing of the first data draining request has been completed.

2. The electronic device as claimed in claim 1, wherein after the software changes the configuration of the remapping hardware and before the remapping hardware outputs the first data draining request, the remapping hardware determines that there is no previous data draining request that has not been completed.

3. The electronic device as claimed in claim 1, wherein the Northbridge IC sends a converted DMA request with the physical address to the processor, and the processor sends a processing result to the Northbridge IC as a response, whereon the converted DMA requests are still processed before the first time.

4. The electronic device as claimed in claim 3, wherein the Northbridge IC comprises a counter; and when the Northbridge IC receives the first data draining request at the first time and the Northbridge IC processes the converted DMA requests, the counter is used to store a certain amount of the converted DMA requests, and to store a certain amount of processing results from the processor corresponding to the converted DMA requests.

5. The electronic device as claimed in claim 4, wherein when the Northbridge IC processes one of the converted DMA requests, a count value of the counter is incremented by 1; when the Northbridge IC receives the processing result from the processor corresponding to one of the converted DMA requests, the count value of the counter is decremented by 1; and when the count value of the counter becomes zero, the Northbridge IC outputs the first data draining response to the remapping hardware.

6. The electronic device as claimed in claim 1, further comprising:
a device controller, sending the virtual address to the remapping hardware; wherein
when the device controller receives the first data draining request at the first time, the device controller suspends the unconverted DMA requests received after the first time until a third time;
the device controller outputs a second data draining response to the remapping hardware at the third time, wherein the third time is later than the first time;
the remapping hardware does not notify the processor that the first data draining request has been completed until both the first data draining response and the second data draining response are received.

7. The electronic device as claimed in claim 6, wherein when the software changes the configuration of the remapping hardware, the processor outputs a configuration request to the remapping hardware, so that the remapping hardware correspondingly outputs the first data draining request to the Northbridge IC and the device controller according to the configuration request.

8. The electronic device as claimed in claim 7, wherein the remapping hardware comprises a register; the register comprises at least a first sub-register and a second sub-register; wherein the first sub-register and the second sub-register correspond to the same configuration request; the processor is configured to notify the remapping hardware that the configuration request has been issued by changing the state of the first sub-register; the remapping hardware is configured to notify the processor that data draining associated with the configuration request has completed by changing the state of the second sub-register.

9. A method for co-operating software and hardware, suitable for an electronic device having remapping hardware, a processor, and a Northbridge integrated circuit (IC); wherein the processor executes software to configure the remapping hardware; the method comprising:
the software changes the configuration of the remapping hardware;
the remapping hardware determines that there is no previous data draining request that has not been completed yet;
the remapping hardware outputs a first data draining request to the Northbridge IC;
the Northbridge IC receives the first data draining request at a first time;
the Northbridge IC suspends unconverted DMA requests received after the first time until a second time;
the Northbridge IC outputs a first data draining response to the remapping hardware at the second time; wherein the second time is later than the first time; and
the remapping hardware receives the first data draining response and notifies the processor that the first data draining request has been completed.

10. The method as claimed in claim 9, wherein when the electronic device further comprises a device controller, the method further comprises:
the remapping hardware outputs the first data draining request to the device controller;
the device controller receives the first data draining request at the first time;
the device controller suspends the unconverted DMA requests after the first time until a third time;
the device controller outputs a second data draining response to the remapping hardware at the third time; wherein the third time is later than the first time; and
the remapping hardware does not notify the processor that the first data draining request has been completed until receiving both the first data draining response and the second data draining response.

11. The method as claimed in claim 9, wherein when the Northbridge IC receives the first data draining request at the first time, the method further comprises:

the Northbridge IC processes the converted DMA requests being processed before the first time;

the Northbridge IC counts the amount of the converted DMA requests still being processed before the first time; and the Northbridge IC counts the amount of processing results from the processor corresponding to the converted DMA requests still being processed before the first time.

12. The method as claimed in claim 11, wherein when the Northbridge IC receives the first data draining request at the first time, the method further comprises:

the Northbridge IC increments a count value by 1 when the Northbridge IC processes one of the converted DMA requests;

the Northbridge IC decrements the count value by 1 when the Northbridge IC receives the processing result from the processor corresponding to one of the converted DMA requests; and the Northbridge IC outputs the first data draining response to the remapping hardware when the count value becomes zero.

\* \* \* \* \*